Feb. 13, 1951 S. D. SUMERFORD ET AL 2,541,677
HYDROCARBON SYNTHESIS
Filed Aug. 5, 1947
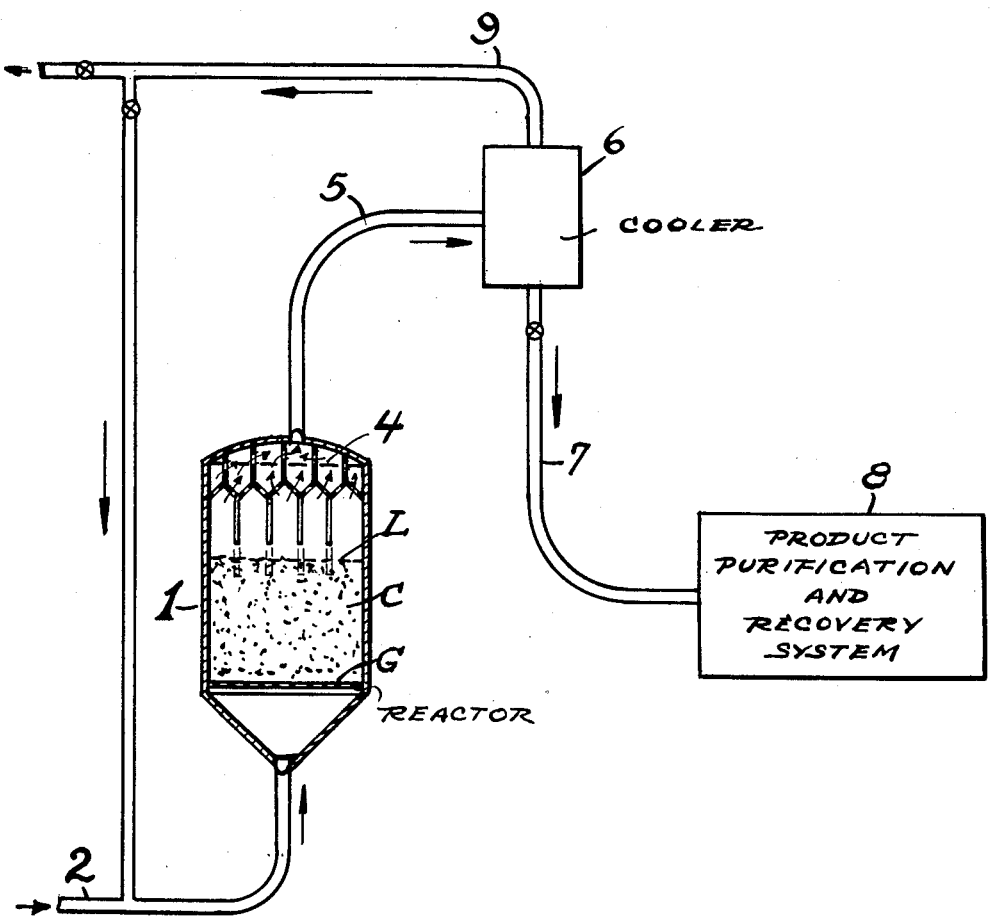

Patented Feb. 13, 1951

2,541,677

UNITED STATES PATENT OFFICE 2,541,677

HYDROCARBON SYNTHESIS

Simpson D. Sumerford and Fred J. Buchmann, Baton Rouge, La., assignors to Standard Oil Development Company, a corporation of Delaware Application August 5, 1947, Serial No. 766,180

11 Claims. (Cl. 260—449.6)

Our present invention relates to a catalytic process for reducing the oxides of carbon in the presence of hydrogen, resulting in the formation of hydrocarbons and oxygenated hydrocarbons. In particular, my invention relates to carrying out the foregoing synthesis in the presence of a fluidized bed of powdered iron catalyst under conditions such that good yields of desired products are obtained and at the same time disintegration and fragmentation of the powdered iron catalyst, comprising a fluidized bed thereof, is materially reduced.

At the present time, considerable research is being conducted in the field of hydrocarbon synthesis employing fluid catalyst technique. The catalyst is iron containing promotional amounts of known activators such as $K_2O$, $KF$, and others. The reaction between the hydrogen and the oxides of carbon is one which results in catalyst disintegration or fragmentation due to the deposition of carbon in some form thereon. The powdered iron should not contain a preponderance of catalyst particle fines, and, in fact, should not contain more than about 20% of catalyst having a particle size from 0 to 20 microns, since a materially greater quantity of fines than that indicated renders the catalyst non-adaptable for good fluidization. It can thus be seen that the physical disintegration of the catalyst is a highly undesirable result.

In brief compass, our present improvements involve retarding or delaying the deposition of carbonaceous material on the catalyst and thereby retarding or delaying its physical disintegration, by first pretreating the catalyst in the reaction zone (or outside it) with a feed gas containing relatively large quantities of hydrogen with respect to the carbon monoxide, and thereafter reducing the ratio of hydrogen to carbon monoxide when the catalyst has acquired resistance to fragmentation. During the preconditioning of the catalyst with a synthesis gas containing a relatively high ratio of hydrogen to carbon monoxide, even though the process is operated under synthesis conditions of temperature, pressure and contact time, the yields are relatively low; but after the aforesaid preconditioning treatment of the catalyst has been accomplished, the yields of desired materials, such as normally liquid hydrocarbons and oxygenated hydrocarbons, is increased to a satisfactory level by reducing the ratio of hydrogen to carbon monoxide in the synthesis gas. During the preconditioning period a high hydrogen partial pressure is maintained in the reaction zone, but this is lowered by lowering the ratio of hydrogen to carbon monoxide in the fresh feed in order to obtain high yields after the preconditioning period is over.

The main object of the present invention, therefore, is to operate a hydrocarbon synthesis process employing the fluid catalyst technique under such conditions that fragmentation of the catalyst is repressed.

Other and further objects of the invention will appear hereinafter.

Before setting forth a detailed description of the several runs which we made in connection with the present invention, it is deemed advisable to define some of the terms to be used in connection with the said description.

In the first place, by "fluid catalyst technique" we refer to that type of operation in which a gasiform material is caused to flow upwardly in the catalyst zone containing a powdered catalytic material at such a flow rate that the catalyst in powdered form is maintained in the form of a dense, ebullient, turbulent suspension.

As hereinafter used, the term "synthesis gas" refers to the fresh feed gas to the reaction zone, and the most important constituents thereof are hydrogen and carbon monoxide, although it may contain minor amounts of normally gaseous hydrocarbons, some water and even some nitrogen. In operating our process, we have found that it should contain only a small amount of carbon dioxide, preferably 2% or less.

In the accompanying drawing, we have shown, diagrammatically, an apparatus in which a preferred modification of our invention may be carried into effect.

Referring in detail to the drawing, 1 represents a reactor provided as shown with a grid or screen G and containing a body of powdered iron catalyst C in the form of a fluidized mass or bed. Synthesis gas enters the system through line 2 and is discharged into the bottom of reactor 1 where it passes upwardly at a sufficiently low superficial velocity to form the dense, fluidized mass previously referred to. This fluidized mass or bed will have an upper dense phase level at some point L, depending upon the superficial gas velocity and the actual weight or amount of catalyst in the reactor. Preferably there is a substantial distance between the upper dense phase level L and the top of the reactor in which the more dilute phase of catalyst exists and which is in effect operates as a catalyst disengaging space, for it is the purpose of so operating such a process as to effect a separation of the main bulk of catalyst from the reactor before the crude reaction products or vapors exit from the said reactor. To effect a further separation of catalyst from vapors passing out of the reactor, it is good practice to dispose in the top of the reactor a plurality of solids separating devices 4 which may be, for example, centrifugal separators through which the vapors or gases are forced for the purpose of separating additional quantities of entrained catalyst and returning them through dip-pipes to the dense phase level. The product vapors are then withdrawn through line 5, discharged usually into a cooler 6, where they are cooled below the condensation temperature of water and then withdrawn through line 7 and discharged into a product purification and recovery system 8 wherein desired products such as gasoline, gas oil, various oxygenated compounds and the like, may be subjected to fractional distillation and recovered according to known procedure. It should be pointed out, of course, that the process results in the production of water and oxygenated compounds which are soluble in the water. There are other oxygenated compounds which are soluble in, or associated with, the oil, but the recovery of these oxygenated hydrocarbons may be accomplished according to known means, and since our improvements do not go to that phase of the operation, it will not be necessary for us to describe such product recovery in detail herein.

Referring again to the recovery apparatus 8, at least a portion of the uncondensed gases are recycled via line 9 to line 3 for further use in the process. In other words, the gases in line 9 may, and usually do, contain some unconverted hydrogen and carbon monoxide. It is, of course, desirable to return this material for economical reasons to the reactor to secure complete conversion of unreacted material. The recycle gas will also contain normally gaseous hydrocarbons.

We set forth now below several runs which we made, or rather several phases of the same general run, in order to test the utility of our invention. In these runs we employed a synthetic ammonia catalyst (fused magnetite) promoted with 0.7 weight per cent of potassium carbonate reported as $K_2O$. During the various periods or phases of the run which we are about to describe, the temperature was maintained at about 650° F. and a total pressure of 400 pounds was maintained in the reaction zone. During the periods, a "superficial" gas velocity of about 0.5 feet per second was maintained in the reaction zone in all but one of the periods.

Period A

During this period, which covered a period of 198 hours, the fresh feed gas, the gas in line 2, had a hydrogen to carbon monoxide ratio of 3.1 to 1, whereas the total feed had a hydrogen to carbon monoxide ratio which varied during the run from 6 to 10 mols of hydrogen per mol of carbon monoxide. The recycle ratio, that is, the ratio of the volumes of gas fed to the reactor from line 9, compared with those entering through fresh feed line 2, was 2 to 1. In other words, for every 3 volumes of gas entering the reactor, 2 of these volumes was material recycled through line 9. The hydrogen partial pressure of the gas entering the reactor was 273 pounds absolute. During Period A, 0.21 gram of carbon was formed on the catalyst per cubic meter of carbon monoxide and hydrogen consumed. At the end of this period a representative sample of the catalyst was removed from the reactor and it was found that it contained 5.3 weight per cent carbon based on the catalyst, that the density of the catalyst was virtually unchanged, the fresh catalyst charged to the reactor having a density of 2.4 grams per cc., while that removed at the end of the period had a density of 2.35. There was, therefore, no expansion of the catalyst, and the upper dense phase level (corresponding to L in the drawing) did not rise, indicating that there was virtually no fragmentation of the catalyst, that the iron catalyst remained in a well-fluidized condition and that the process operated satisfactorily. While the yields of desired product were low, namely 119 cubic centimeters of $C_4+$ hydrocarbons per cubic meter of hydrogen and carbon monoxide converted, nevertheless the process was deemed to have operated satisfactorily during this initial stage, for the purpose was to condition the catalyst so as to make it resistant to physical disintegration and the formation of substantial quantities of fines.

Period B

In this period, the same recycle ratio was employed as in Period A; and furthermore, the same conditions of temperature and pressure were maintained in the reaction zone. The ratio of hydrogen to carbon monoxide in the fresh feed was 2.6 mols of hydrogen per mol of carbon monoxide and from 5 to 6.5 mols of hydrogen per mol of carbon monoxide were maintained in the total feed in this period. A hydrogen partial pressure of 226 pounds absolute prevailed at the point where the gases entered the reactor. The length of this period was 176 hours. It was noted that the production of carbonaceous material on the catalyst was even lower in this period than in Period A, for analysis showed that 0.11 gram of carbon per cubic meter of carbon monoxide and hydrogen consumed were formed on the catalyst. It was also noted that there was virtually no expansion of the fluid catalyst bed, that is to say, the upper dense phase level did not rise, and that a sample of the catalyst withdrawn from the reactor at the end of the run had a density of 2.27 grams per cubic centimeter. Analysis showed that the catalyst contained 8 weight per cent carbonaceous material based on the catalyst. The yields during this period show an improvement, namely 129 cubic centimeters of $C_4+$ hydrocarbons and oxygenated hydrocarbons (exclusive of water phase) were obtained.

Period C

In this period, the same recycle ratio, namely 2:1, was employed, the temperature and pressure were also the same as in Periods A and B. But in this run the molecular ratio of hydrogen to carbon monoxide was reduced, the fresh feed having a ratio of 2.1 mols of hydrogen per mol of carbon monoxide, whereas the total feed had from 3.7 to 4.3 mols of hydrogen. The hydrogen partial pressure during this period was somewhat lower, being 187 pounds per square inch absolute. During this period, 0.15 gram of carbon per cubic meter of carbon monoxide and hydrogen converted were formed on the catalyst. A yield of 174 cubic centimeters of $C_4+$ hydrocarbons and oxygenated hydrocarbons (exclusive of water phase) were formed during this Period C, which extended for 244 hours. During this period, there was a 30% expansion in the depth of the bed, that is to say, the upper dense phase level rose to that extent. An analysis of the catalyst showed that it contained 13.3 weight per cent carbon based on the catalyst and that its density was 1.9.

Period D

In Period D, the same recycle ratio, same temperature, same pressure and virtually the same superficial gas velocity in the reactor were maintained as in the prior periods, but here the hydrogen to carbon monoxide ratio in the fresh feed was reduced to 1.9 mols of hydrogen per mol of carbon monoxide; and in the total feed, from 3 to 3.5 mols of hydrogen per mol of carbon monoxide were present. The hydrogen partial pressure was 170 pounds per square inch absolute. During this period, which extended for 203 hours, 0.24 gram of carbon per cubic meter of carbon monoxide and hydrogen consumed were formed on the catalyst. The yield was 178 cubic centimeters of $C_{4+}$ hydrocarbons per cubic meter of carbon monoxide and hydrogen consumed. A sample removed at the end of the run from the reactor and analyzed showed that the same contained 23.9 weight per cent of carbonaceous material on catalyst, that the density of the catalyst as removed was 1.4 grams per cubic centimeter. During this period, the dense phase suspension or fluidized bed expanded 50%.

Period E

In Period E, the same recycle ratio, same temperature, same pressure, and virtually the same superficial gas velocity in the reactor were maintained as in the prior periods, but here the hydrogen in the fresh feed was 1.5 mols of hydrogen per mol of carbon monoxide; and in the total feed from 2.1 to 2.3 volumes of hydrogen per volume of carbon monoxide. The hydrogen partial pressure during this period was 129 pounds per square inch. During this period, which extended through 210 hours, 0.28 gram of carbon per cubic meter of hydrogen and carbon monoxide consumed were laid down on the catalyst. The yield was 188 cc. of $C_{4+}$ hydrocarbons per cubic meter of hydrogen and carbon monoxide consumed. At the expiration of this period, the catalyst contained 42 weight per cent carbonaceous material, that is to say, carbon in an extractable form, carbon in the form of iron carbide, and carbon which was neither extractable nor in the form of iron carbide.

Period F

In this period, the same conditions of temperature and pressure were employed as in the previous periods, but the recycle ratio was increased up to 6 volumes of recycle material per volume of fresh feed. The hydrogen in the fresh feed had a mol ratio of 2:1 with respect to the carbon monoxide; and the total feed, from 3 to 3.3:1. In this period, the hydrogen partial pressure was 75 pounds. The space velocity was somewhat lower here, also, being of the order of 0.38 feet per second expressed as superficial velocity. During the run, 1.4 grams of carbon was formed per cubic meter of hydrogen and carbon monoxide consumed. The yield was 183 cubic centimeters of $C_{4+}$ hydrocarbons. The duration of this period was 138 hours. During this time, the expansion of the dense phase suspension or bed was 66%.

In order to demonstrate the improvement attainable by preconditioning the catalyst, consider the run made below under the conditions set forth below, comparable to Period F, except that the catalyst was not preconditioned, as follows:

Operating with 1.91 $H_2$/CO in the fresh feed, 7/1 recycle ratio, and 74 p. s. i. a. hydrogen partial pressure, the yields of $C_{4+}$ hydrocarbons and carbon were 188 cc. $C_{4+}$ hydrocarbons per cubic meter $H_2$+CO consumed, and 7.5 grams carbon per cubic meter $H_2$+CO consumed. It will be noted that more carbon accumulated on the catalyst that had not been preconditioned (compare 7.5 grams carbon per cubic meter $H_2$+CO consumed). In other words, a catalyst that has been preconditioned can be used at the typically severe conditions of a hydrocarbon synthesis reaction with less carbon formation than one which has not been so conditioned.

It will be noted that in the immediately preceding run, carbon formation was 7.5 grams per cubic meter of $H_2$+CO consumed, whereas in Period F, the carbon formation on the same basis was merely 1.4. In other words, the preconditioning of the catalyst as indicated in Period F, very definitely decreases rate of carbon formation on the catalyst.

The results of the runs indicate that the hydrocarbon synthesis process may be improved by subjecting the catalyst to a preconditioning treatment with synthesis gases under synthesizing conditions, the synthesis gas, however, containing a relatively large proportion of hydrogen with respect to carbon monoxide. This proportion should vary from 2.5 to 3 mols of hydrogen per mol of carbon monoxide. The preconditioning period should extend from 10 to 300 hours, but preferably from 40 to 200 hours, during which preconditioning period relatively low yields of desired products may be expected. Following the preconditioning period, however, more severe conditions are permissible, that is to say, the ratio of hydrogen to carbon monoxide in the total feed may be reduced to the order of 2 mols of hydrogen per mol of carbon monoxide or lower, and in this manner the yields of desirable products such as $C_{4+}$ hydrocarbons will be increased. Consequently, the data show that the preconditioning period permits satisfactory operation of the process with high yields of desired products in the productive phase, with good resistance of catalyst to fragmentation and the production of a gasoline fraction of high anti-detonation quality. An inspection of the gasoline product during the periods below indicated is as follows:

| Period | ASTM O. N. | ASTM+2 cc. TEL | Res. Clear | Res.+2 cc. TEL | RVP |
|---|---|---|---|---|---|
| D | 64.0 | 71.4 | 72.0 | 81.4 | 6.7 |
| E | 64.3 | 74.9 | 74.8 | 83.6 | 6.6 |
| F | 60.6 | 72.4 | 72.0 | 82.8 | 6.4 |

By suitable treating, Res. clear O. N. can be raised to 90 or better.

Another feature of our invention is that during the several periods described, oxygenated hydrocarbons were formed. For example, during Period A, oxygenated compounds were found in both the oil and water layers. During Period A, 13 cc. oxygenated compounds (calculated as ethyl alcohol) per cubic meter of $H_2$+CO consumed were found in the water layer. In Period B, a similar amount of oxygenated compounds were found. In Period C, 27 cc. ethyl alcohol were found; in Period D, 28 cc. ethyl alcohol; in Period E, 22 cc.; and in Period F, 14 cc.

While we have described in detail our improvements in connection with a synthetic ammonia catalyst, it will be understood that we may use other forms of iron, such as pyrites ash, red iron oxide, precipitated iron, etc.

Also, our improvements include continuous adjustment of the $H_2$ to CO ratio during the synthesis process, that is to say, conducting the operation so that the $H_2$ to CO ratio may be changed without interrupting the process.

To recapitulate, our invention relates to operating a hydrocarbon synthesis process in fluidized operation under conditions such that good yields are obtained by the severe conditions, that is, high temperature (600° F. and above) and relatively low ratios of hydrogen to carbon monoxide (below 2:1) and at the same time prevent serious physical disintegration of the powdered iron catalyst which we prefer to employ.

Numerous modifications of our invention may be made by those familiar with the art without departing from the spirit thereof.

We claim:

1. The method of synthesizing hydrocarbons and oxygenated hydrocarbons from a feed gas containing hydrogen and carbon monoxide, which comprises contacting said feed gas with a fluidized bed of powdered iron catalyst in a reaction zone during a preconditioning period at elevated temperatures and a superatmospheric total pressure and while maintaining a high hydrogen partial pressure in said reaction zone and also maintaining a relatively high molecular ratio of hydrogen to carbon monoxide until the catalyst is procured in a form resistant to fragmentation, thereafter lowering the ratio of hydrogen to carbon monoxide in the feed gas so that it does not exceed about 2 mols of hydrogen per mol of carbon monoxide while maintaining substantially said total pressure whereby high yields of desired products are formed, and recovering from the reaction zone desired products.

2. The method of claim 1 in which a total pressure is maintained in the reaction zone in excess of about 350 pounds per square inch, absolute.

3. The method of claim 2 in which a hydrogen partial pressure of about 150 to 270 pounds per square inch absolute is maintained in the reaction zone during the preconditioning period of the operation.

4. The method of claim 3 in which the catalyst is powdered fused magnetite.

5. The method of synthesizing hydrocarbons and oxygenated hydrocarbons from a feed gas containing hydrogen and carbon monoxide, which comprises contacting said feed gas with a fluidized bed of powdered iron catalyst in a reaction zone during a preconditioning period at elevated temperatures and a superatmospheric total pressure and while maintaining a high hydrogen partial pressure in said reaction zone and also maintaining a relatively high molecular ratio of hydrogen to carbon monoxide until the catalyst is procured in form resistant to fragmentation, thereafter lowering the ratio of hydrogen to carbon monoxide in the feed gas whereby high yields of desired products are formed, and recovering from the reaction zone desired products.

6. The method set forth in claim 1 in which the hydrogen partial pressure in the reaction zone is maintained within the range of from about 70 to 170 pounds per square inch absolute during the operations following the preconditioning period.

7. The method of claim 1 in which the operation is conducted continuously and includes the step of continuously adjusting the hydrogen to carbon monoxide ratio responsive to the requisites of substantially low carbon formation and high yields, said ratio being increased as carbon tends to form in inordinately large amounts and reduced when the tendency to form carbon on the catalyst is suppressed.

8. The method of claim 1 in which said relatively high ratio is substantially above 2.

9. The method of claim 5 in which said relatively high ratio is substantially above 2 and said lowered ratio is not in excess of 2.

10. The method of claim 5 in which said preconditioning period extends over at least 10 hours.

11. The method of claim 10 in which said period extends over 40–200 hours.

SIMPSON D. SUMERFORD.
FRED J. BUCHMANN.

REFERENCES CITED

The following references are of record in the file of this patent:

UNITED STATES PATENTS

| Number | Name | Date |
| --- | --- | --- |
| 2,251,554 | Sabel et al. | Aug. 5, 1941 |
| 2,257,457 | Fischer et al. | Sept. 30, 1941 |
| 2,417,164 | Huber, Jr. | Mar. 11, 1947 |
| 2,438,584 | Stewart | Mar. 30, 1948 |
| 2,461,570 | Roberts | Feb. 15, 1949 |